United States Patent [19]

Hunt et al.

[11] Patent Number: 5,037,942
[45] Date of Patent: Aug. 6, 1991

[54] CONTINUOUS MOTIONLESS MIXER REACTOR PROCESS FOR THE PRODUCTION OF BRANCHED POLYCARBONATE

[75] Inventors: Sheri L. Hunt; Thoi H. Ho, both of Lake Jackson, Tex.

[73] Assignee: The Dow Chemical Company, Midland, Mich.

[21] Appl. No.: 500,655

[22] Filed: Mar. 28, 1990

[51] Int. Cl.$^5$ ............................................. C08G 64/20
[52] U.S. Cl. .................... 528/198; 528/196; 528/204
[58] Field of Search .................. 528/198, 204, 196

[56] References Cited

U.S. PATENT DOCUMENTS

| Re. 27,682 | 6/1973 | Schnell et al. | |
|---|---|---|---|
| 3,133,044 | 5/1964 | Allen et al. | 260/47 |
| 3,240,755 | 3/1966 | Cawthon et al. | 260/47 |
| 3,530,094 | 9/1970 | Schnell et al. | 260/47 |
| 3,674,740 | 7/1972 | Vernalcken et al. | 260/47 |
| 3,787,359 | 1/1974 | Horn et al. | 260/47 |
| 3,945,969 | 3/1976 | Horn et al. | 260/47 |
| 3,974,126 | 8/1976 | Narita et al. | 260/47 |
| 4,122,112 | 10/1978 | Koda et al. | 260/47 |
| 4,680,370 | 7/1987 | Williams | 528/167 |
| 4,847,352 | 7/1989 | Weston et al. | 528/196 |

OTHER PUBLICATIONS

Dobkowski Zbignew et al., Synthesis of Polycarbonates by Interfacial Method, "Polimeryfwoz wielkoszasteczk.", 1970, No. 8, pp. 428–431 (pp. 5–6).
O. V. Smirnova et al., Polycarbonates, "Khimia" Publishers, 1975, pp. 7–15.
S. J. Chen et al., Chemical Engineering, Mar. 19, 1973, pp. 105–111.

*Primary Examiner*—Harold D. Anderson

[57] ABSTRACT

Branched polycarbonate prepolymers are produced by adding phosgene, one or more dihydric phenols, one or more polyhydric phenols, a halogenated organic solvent, and an aqueous caustic solution together with mixing in motionless mixers to form fine dispersions of partially phosgenated phenols, allowing for interfacial reactions to occur in residence time sections and repeating the steps after the addition of caustic to form high molecular weight prepolymers. These prepolymers are then polymerized with amines to form branched high molecular weight polycarbonates.

12 Claims, No Drawings

CONTINUOUS MOTIONLESS MIXER REACTOR PROCESS FOR THE PRODUCTION OF BRANCHED POLYCARBONATE

BACKGROUND OF THE INVENTION

This invention relates to an interfacial process for the production of high molecular weight polycarbonates wherein high molecular weight prepolymers are first formed using one or more motionless mixers and are then coupled to form the polycarbonates.

It is known from U.S. Pat. No. 3,674,740 that polycarbonates can be made from carbonate forming monomers in a tubular reactor using a series of mixing tubes and residence time tubes. However, this known process is designed to produce emulsions which are difficult to process for the recovery of the polycarbonate resins. Other related processes for the production of polycarbonates are known from U.S. Pat. Nos. 3,974,126 and 3,530,094, but none of these patents teaches the making of high molecular weight prepolymers and the polymerization thereof.

A continuous process for making linear polycarbonate is disclosed in U.S. Pat. No. 4,847,352. However, this patent does not disclose use of that process for making branched polycarbonate.

SUMMARY OF THE INVENTION

The present invention is directed to a process wherein branched, high molecular weight polycarbonates are prepared by first forming a polycarbonate prepolymer having a weight average molecular weight range of about 4,000 to about 12,000, and mixing an amine catalyst with the prepolymer to form a high molecular weight polycarbonate resin.

In one aspect, this invention involves

A) mixing one or more dihydric phenols, one or more polyhydric phenols, an aqueous caustic solution, a halogenated organic solvent and phosgene by means of at least one motionless mixer to form a fine dispersion of the partially phosgenated derivatives of said phenols in said aqueous solution, B) allowing said dispersion to react in a residence time section, with a residence time in the range from about 5 to about 75 seconds, into a coarse dispersion containing said partially phosgenated derivatives of said phenols, C) repeating the mixing and reacting steps of A and B one or more times until said phenols are completely phosgenated, D) mixing additional aqueous caustic solution with said dispersion, E) cooling said dispersion to a temperature in the range from about 25° C. to about 45° C., and F) repeating the mixing and reacting steps of A and B whereby a dispersion of a polycarbonate prepolymer having a weight average molecular weight range of about 4,000 to about 12,000 is obtained.

In another aspect, this invention involves

A) mixing one or more dihydric phenols, one or more polyhydric phenols, an aqueous caustic solution, a halogenated organic solvent and phosgene by means of at least one motionless mixer in a reactor to form a fine dispersion of the partially phosgenated derivatives of said phenols in said aqueous solution, B) allowing said dispersion to react in a residence time section of said reactor, during a residence time in said section in the range from about 5 to about 75 seconds, into a coarse dispersion containing said partially phosgenated derivatives of said phenols, C) repeating the mixing and reacting steps of A and B one or more times until said phenols are completely phosgenated, D) mixing additional aqueous caustic solution with said dispersion, E) repeating the mixing and reacting steps of A and B whereby a dispersion of a polycarbonate prepolymer having a weight average molecular weight range of about 4,000 to about 12,000 is obtained, F) simultaneously cooling said dispersion to a temperature in the range from about 25° C. to about 45° C. and mixing a tertiary amine catalyst with said dispersion to form polycarbonate resin, and G) recovering said polycarbonate resin.

DETAILED DESCRIPTION OF THE INVENTION

Any suitable aromatic dihydroxy compound can be used in the present invention to form polycarbonate. There are vast numbers of suitable dihydroxy compounds cited in the patent literature as is illustrated by U.S. Pat. No. 3,530,094, which is incorporated by reference herein.

Normally, about 1.2 to 2.0 moles of phosgene will be used per mole of dihydric phenol in this process. A slight excess of phosgene is used in order to achieve complete reaction.

Examples of halogenated solvents useful in this invention are chlorobenzene, chloroform, carbon tetrachloride, 1,2-dichloroethane, methylene chloride, 1,1,2-trichloroethane, tetrachloroethane, and mixtures thereof.

Organic poly(hydroxyphenyl) compounds (also referred to as "polyhydric phenols"), having more than two hydroxy groups per molecule, may also be added to the reaction mixture for the purpose of forming branched polycarbonate. One or more of these organic poly(hydroxyphenyl) compounds may be added to the reaction mixture at the same point in the process, and in the same manner, as the dihydroxy compound(s) from which the balance of the polycarbonate chain is formed. Organic poly(hydroxyphenyl) compounds may be used in the process of this invention in amounts ranging from about 0.1% to about 2.0%, and preferably from about 0.25% to about 1.0%, by weight of the dihydroxy compound(s) employed in the reaction mixture. Examples of organic poly(hydroxyphenyl) compounds suitable for use as branching agents herein are:

4,6-dimethyl-2,4,6-tri-(4-hydroxyphenyl) heptane, 1,3,5-tri-(4-hydroxphenyl)-benzene, 2,2-bis-[4,4'-(dihydroxy-diphenyl)-cyclohexyl)propane, and bis-[2-hydroxy-3-(2'-hydroxy-5'-methylbenzyl)-5-methylphenyl]-methane.

Other suitable organic poly(hydroxyphenyl) compounds are set forth in U.S. Pat. No. 3,544,514, which is incorporated herein. A preferred organic poly(hydroxyphenyl) compound is 1,1,1-tri-(4-hydroxphenyl) ethane ("THPE").

The pH of the final reaction mixture after addition of a tertiary amine catalyst is maintained in the range from about 11 to about 13, depending on the bisphenol used, and preferably in the range from 11 to 11.5.

For the purposes of this invention, introducing the monomer mix into at least one motionless mixer allows the interfacial process to first produce a fine dispersion of the dihydric and polyhydric phenols contained in the monomer mix. The droplet size in this fine dispersion is less than 100 microns. Allowing the dispersion to react in a residence time section of the reactor, where no mixing apparatus is located, produces a coarse dispersion of the dihydric and polyhydric phenols contained in the monomer mix. The droplet size in this coarse dispersion is in the range of 100 to 1,000 microns. This excludes the known emulsions which have a drop size of about one micron. As the mixing and reacting steps proceed, the derivatives of the phenols used in the monomer mix, which initially are partially phosgenated because not all of them have reacted with phosgene, become completely phosgenated. The prepolymers formed by this process, which are suspended in the aqueous phase and are eventually coupled into the high weight average molecular weight polycarbonate resins of this invention, have a weight average molecular weight in the range of about 4,000 to about 12,000.

The motionless mixers used herein are well known in the art as shown by the article by Chen et al in *Chemical Engineering*, Mar. 19, 1973, pages 105–111. After the reaction mixture leaves a motionless mixer, its residence time in a residence time section of the reactor is in the range from about 5 to about 75 seconds, and preferably in the range from about 20 to about 40 seconds.

The reaction mixture dispersion can be cooled to a temperature in the range of about 25° C. to about 50° C., and preferably in the range of about 25° C. to about 45° C., by use of a tube and shell heat exchanger or a stirred flash tank equipped with a reflux condenser or other cooling apparatus. This can be done before or after the prepolymer in the dispersion is brought to the 4,000–12,000 molecular weight range, or at both points in the process.

The invention is further illustrated by the following non-limiting examples. Examples 1-5 are taken from U.S. Pat. No. 4,847,352 to illustrate the process for making a prepolymer and making polycarbonate resin from the prepolymer. Examples 6 and 7 show that when a branching agent is used in the monomer mix according to this process, branched polycarbonate is produced.

EXAMPLE 1

Using a flow rate of 100 ml per minute, a mixture of p-tertiarybutyl phenol, water, methylene chloride, phosgene, sodium hydroxide and bisphenol A, is pumped through a series of two in-line motionless mixers having a diameter of 0.187 inches and connected by a pipe having a diameter of 0.375 inches with a total residence time of one minute for the series. The weight ratios of the ingredients compared to bisphenol A are 0.023: 5.20: 7.14: 0.61: and 0.74 respectively.

After the monomers are mixed, 10.5 gms per minute of a 50% aqueous solution of sodium hydroxide is added to the reactants and further mixing is done in a third motionless mixer followed by a continuously stirred reactor having a residence time of 3 minutes.

A sample of the prepolymer mixture thus formed is analyzed and found to have a weight average molecular weight of 4,380, a polydispersity of 2.75, 384 parts per million of phenolic end groups, and a chloroformate to hydroxyl mole ratio of 30. By using published correlations, the droplet size is calculated to be about 1,000 μm.

After the addition of 1.5 grams of triethylamine to the prepolymers and three minutes of mixing, a sample of the mixture is processed and the bisphenol A polycarbonate is isolated. It is found to have weight average molecular weight of 28,390, a polydispersity of 2.36, and 80 parts per million of phenolic end groups. The results are shown in Table I.

Control A

The procedure of Example 1 is repeated except that the 50% NaOH is not added. The results are shown in Table I.

Control B

The procedure of Example 1 is repeated except that the motionless mixer in the NaOH section is not used and a continuously stirred tank reactor is used instead. The results are shown in Table I.

TABLE I

| | Prepolymer Properties | | | |
|---|---|---|---|---|
| Run | Prepolymer Mol. Wt. | Polydispersity | Phenolic End Groups (ppm) | Chloroformate/OH Mole Ratio |
| Example 1 | 4,380 | 2.75 | 384 | 30 |
| Control A | 800 | 2.0 | 800 | 40 |
| Control B | 2,300 | 2.2 | 2372 | n.a. |

EXAMPLE 2

This example is a process similar to Example 1, except that the continuous addition of triethylamine is used. A monomer mixture containing of 213 pounds per hour (pph) of bisphenol A, 157 pph of 50% sodium hydroxide solution, 1,112 pph of water, and 3.3 pph of p-tertiarybutyl phenol is continuously mixed together in a mixing tank. In a similar tank, 122 pph of phosgene and 778 pph of methylene chloride are mixed together to form a solvent mixture. These two mixtures are combined and pumped through a series of two motionless mixers having a diameter of 1.0 inch connected together by piping to give 30 seconds of residence time in the pipes between the mixers.

After the last mixer and residence time lag, 92 pph of 50% sodium hydroxide solution is added to the reactants. The heat of the reaction is removed with a tube and shell heat exchanger so as to keep the reaction mixture at a temperature in the range from 25° to 50° C. A sample of the reaction mixture at this point indicated that the prepolymer has a molecular weight of 6,167, a polydispersity of 1.98, and 209 parts per million of phenolic end groups.

The cooled mixture is pumped through another series of four motionless mixers similar to the first series connected together by piping to give 30 seconds of residence time in the pipes between the mixers. The total residence time in this set of mixers is 2 minutes. An estimation of the droplet sizes of the dispersion based on published correlations indicates that it has droplet sizes ranging from 300 to 500 μm, which is much less than the dispersion of Example 1.

After the last mixer, 3.1 pph of triethylamine and 1,556 pph of methylene chloride is added to the dispersion and it is pumped through another series of five similar motionless mixers connected together by piping to give 30 seconds of residence time in the pipes between the mixers. The dispersion after these mixers contains no detectable chloroformate end groups.

After recovering the polycarbonate resin, it is found to have a weight average molecular weight of 39,800, a polydispersity of 2.8, and 51 parts per million of phenolic end groups.

EXAMPLES 3 AND 4.

The procedure of Example 2 is repeated with the same (Example 4) and different (Example 3) amounts of the p-tertiarybutyl phenol ("PTBP") chain terminator. The results are set forth in Table II.

TABLE II

| Results of Examples 3 and 4 | | | |
|---|---|---|---|
| Run | Amount of PTBP Terminator (pph) | Prepolymer MW | Polymer MW |
| Example 3 | 6.43 | 5,900 | 21,300 |
| Example 4 | 3.30 | 11,200 | 44,000 |

EXAMPLE 5

The procedure of Example 1 is substantially repeated except that the heat exchanger is removed and the three minute stirred reactor is replaced with a stirred flash tank equipped with a reflux condenser for cooling. The flash tank has a residence time of 15 minutes. A sample of the prepolymer before the flash tank is found to have a molecular weight of 7,500. Triethylamine at the rate of 0.02 grams per minute is added to the tank. The resulting polycarbonate resin had a molecular weight of 30,200 with a polydispersity of 2.5.

EXAMPLE 6

A monomer mix tank is charged with 8,115 g of water, 1,350 g of bisphenol A, 1,412 g of 34% caustic (NaOH), 29.4 g of p-tertiarybutylphenol, and 7.25 g of THPE. Weight percent of the THPE to bisphenol A equals 0.54%. The monomer solution is contacted with phosgene and methylene chloride, solvent, in a ⅜ inch tubular reactor with a residence time of 2 minutes. Three 6 inch and one 12 inch long 3/16 inch diameter in-line motionless mixers are used to improve liquid/liquid contacting. The residence time between each of the motionless mixers is in the range from about 5 to about 75 seconds. The monomer flow rate is 40 g/min, phosgene flow rate 3 g/min, and methylene chloride flow rate 30 g/min. A second shot of 7 g/min of caustic is added half way through the phosgenation reactor. The heat produced by the phosgenation of the monomers is removed by flashing the vapor in a flash pot. The vapor is condensed and returned to the flash pot. The polycarbonate prepolymer formed at this point in the reaction has a weight average molecular weight in the range of about 4,000 to about 12,000.

A dilution stream of methylene chloride containing triethylamine is added after the flash pot at 34 g/min. The dilution stream of MeCl$_2$ contains 10 g TEA/10000 g MeCl$_2$. Other process variables include a monomer mix temperature of 25° C., a phosgenation reactor pressure of 1050 mm Hg, a flash pot level of 30%, and a flash pot agitator speed of 1500 rpm. The polycarbonate produced in Example 6 has a weight average molecular weight of 32,812, and a ratio of weight average molecular weight to number average molecular weight of 3.37.

A sample of the polycarbonate produced in Example 6 is hydrolyzed. Analysis of the hydrolized sample by liquid chromatography shows that 100% of the THPE is incorporated into the polycarbonate product.

EXAMPLE 7

Example 6 is repeated except that THPE is added to the monomers after the level in the monomer mix tank has dropped to 50%. The polycarbonate produced in Example 7 has a weight average molecular weight of 34,125, and a ratio of weight average molecular weight to number average molecular weight of 3.39.

A sample of the polycarbonate produced in Example 7 is hydrolyzed and analyzed as described in Example 6. The results show that 98.7% of the THPE is incorporated into the polycarbonate product.

We claim:

1. An interfacial process for the production of a polycarbonate prepolymer having a weight average molecular weight range of about 4,000 to about 12,000, comprising the steps of
   A) mixing one or more dihydric phenols, one or more polyhydric phenols having more than two hydroxyl groups per molecule, an aqueous caustic solution, a halogenated organic solvent and phosgene by means of at least one motionless mixer to form a fine dispersion of the partially phosgenated derivatives of said phenols in said aqueous solution,
   B) allowing said dispersion to react in a residence time section, with a residence time in the range from about 5 to about 75 seconds, into a coarse dispersion containing said partially phosgenated derivatives of said phenols,
   C) repeating the mixing and reacting steps of A and B one or more times until said phenols are completely phosgenated,
   D) mixing additional aqueous caustic solution with said dispersion,
   E) cooling said dispersion to a temperature in the range from about 25° C. to about 45° C., and
   F) repeating the mixing and reacting steps of A and B whereby a dispersion of a polycarbonate prepolymer having a weight average molecular weight range of about 4,000 to about 12,000 is obtained.

2. An interfacial process for the production of a polycarbonate prepolymer having a weight average molecular weight range of about 4,000 to about 12,000, comprising the steps of
   A) mixing bisphenol A, one or more polyhydric phenols having more than two hydroxyl groups per molecule, an aqueous caustic solution, methylene chloride and phosgene by means of at least one motionless mixer to form a fine dispersion of the partially phosgenated derivatives of said phenols in said aqueous solution,
   B) allowing said dispersion to react in a residence time section, with a residence time in the range from about 20 to about 40 seconds, into a coarse dispersion containing said partially phosgenated derivatives of said phenols,
   C) repeating the mixing and reacting steps of A and B one or more times until said phenols are completely phosgenated,
   D) mixing additional aqueous caustic solution with said dispersion,
   E) cooling said dispersion to a temperature in the range from about 25° C. to about 45° C., and
   F) repeating the mixing and reacting steps of A and B whereby a dispersion of polycarbonate prepolymer having a weight average molecular weight range of about 4,000 to about 12,000 is obtained.

3. An interfacial process for the production of a polycarbonate prepolymer having a weight average molecular weight range of about 4,000 to about 12,000, consisting essentially of the steps of
   A) mixing one or more dihydric phenols, one or more polyhydric phenols having more than two hydroxyl groups per molecule, an aqueous caustic solution, a halogenated organic solvent and phosgene by means of a motionless mixer to form a fine dispersion of the partially phosgenated derivatives of said phenols in said aqueous solution,
   B) reacting said dispersion in a residence time section with a residence time in the range from about 5 to about 75 seconds into a coarse dispersion containing said partially phosgenated derivatives of said phenols,
   C) mixing said coarse dispersion containing said partially phosgenated derivatives of said phenols in a second motionless mixer to form a second fine dispersion,
   D) reacting said dispersion in a second residence time section into a coarse dispersion containing said phosgenated derivatives of said phenols,
   E) mixing additional aqueous caustic solution with said dispersion,
   F) cooling said dispersion to a temperature in the range from about 25° C. to about 45° C., and
   G) repeating the mixing and reacting steps of A-D until a dispersion of a polycarbonate prepolymer having a weight average molecular weight range of about 4,000 to about 12,000 is obtained.

4. An interfacial process for the production of a polycarbonate prepolymer having a weight average molecular weight range of about 4,000 to about 12,000, consisting essentially of the steps of
   A) mixing bisphenol A, one or more polyhydric phenols having more than two hydroxyl group per molecule, an aqueous caustic solution, a chlorinated organic solvent and phosgene by means of a motionless mixer to form a fine dispersion of the partially phosgenated derivatives of said phenols in said aqueous solution,
   B) reacting said dispersion in a residence time section with a residence time in the range from about 5 to about 75 seconds into a coarse dispersion containing said partially phosgenated derivatives of said phenols,
   C) mixing said coarse dispersion containing said partially phosgenated derivatives of said phenols in a second motionless mixer to form a second fine dispersion,
   D) reacting said dispersion in a second residence time section into a coarse dispersion containing said phosgenated derivatives of said phenols,
   E) mixing additional aqueous caustic solution with said dispersion,
   F) cooling said dispersion to a temperature in the range from about 25° C. to about 45° C., and
   G) repeating the mixing and reacting steps of A-D until a dispersion of a polycarbonate prepolymer having a weight average molecular weight range of about 4,000 to about 12,000 is obtained.

5. A process for the production of high weight average molecular weight polycarbonate resin, consisting essentially of the steps of
   A) mixing one or more dihydric phenols, one or more polyhydric phenols having more than two hydroxyl groups per molecule, an aqueous caustic solution, a halogenated organic solvent and phosgene by means of at least one motionless mixer in a reactor to form a fine dispersion of the partially phosgenated derivatives of said phenols in said aqueous solution,
   B) allowing said dispersion to react in a residence time section of said reactor, during a residence time in said section in the range from about 5 to about 75 seconds, into a coarse dispersion containing said partially phosgenated derivatives of said phenols,
   C) repeating the mixing and reacting steps of A and B one or more times until said phenols are completely phosgenated,
   D) mixing additional aqueous caustic solution with said dispersion,
   E) repeating the mixing and reacting steps of A and B whereby a dispersion of a polycarbonate prepolymer having a weight average molecular weight range of about 4,000 to about 12,000 is obtained,
   F) simultaneously cooling said dispersion to a temperature in the range from about 25° C. to about 45° C. and mixing a tertiary amine catalyst with said dispersion to form said polycarbonate resin, and
   G) recovering said polycarbonate resin.

6. A process for the production of high weight average molecular weight polycarbonate resin, consisting essentially of the steps of p1 A) mixing bisphenol A, one or more polyhydric phenols having more than two hydroxyl groups per molecule, an aqueous caustic solution, methylene chloride and phosgene by means of at least one motionless mixer in a reactor to form a fine dispersion of the partially phosgenated derivatives of said phenols in said aqueous solution,
   B) allowing said dispersion to react in a residence time section of said reactor, during a residence time in said section in the range from about 20 to about 40 seconds, into a coarse dispersion containing said partially phosgenated derivatives of said phenols,
   C) repeating the mixing and reacting steps of A and B one or more times until said phenols are completely phosgenated,
   D) mixing additional aqueous caustic solution with said dispersion,
   E) repeating the mixing and reacting steps of A and B whereby a dispersion of a polycarbonate prepolymer having a weight average molecular weight range of about 4,000 to about 12,000 is obtained, and
   F) simultaneously cooling said dispersion to a temperature in the range from about 25° C. to about 45° C. and mixing a trialkylamine catalyst with said dispersion to form said polycarbonate resin, and
   G) recovering said polycarbonate resin.

7. A process for the production of high weight average molecular weight polycarbonate resin, consisting essentially of the steps of
   A) mixing one or more dihydric phenols, one or more polyhydric phenols having more than two hydroxyl groups per molecule, an aqueous caustic solution, a halogenated organic solvent and phosgene by means of a motionless mixer in a reactor to form a fine dispersion of the partially phosgenated derivatives of said phenols in said aqueous solution,
   B) reacting said dispersion in a residence time section of said reactor, during a residence time in said section in the range from about 5 to about 75 seconds, into a coarse dispersion containing said partially phosgenated derivatives of said phenols,
C) mixing said coarse dispersion containing said partially phosgenated derivatives of said phenols in a second motionless mixer in said reactor to form a second fine dispersion,
D) reacting said second fine dispersion in a second residence time section of said reactor into a second coarse dispersion containing said phosgenated derivatives of said phenols,
E) mixing additional aqueous caustic solution with said dispersion,
F) cooling said dispersion to a temperature in the range from about 25° C. to about 45° C.,
G) repeating the mixing and reacting steps of A through D until a dispersion of a polycarbonate prepolymer having a weight average molecular weight range of about 4,000 to about 12,000 is obtained,
H) cooling said dispersion to a temperature in the range from about 25° to about 45 ° C. and mixing a tertiary amine catalyst with said dispersion to form said polycarbonate resin, and
I) recovering said polycarbonate resin.

8. A process for the production of high weight average molecular weight polycarbonate resin, consisting essentially of the steps of
A) mixing bisphenol A, one or more polyhydric phenols having more than two hydroxyl groups per molecule, an aqueous caustic solution, a chlorinated organic solvent and phosgene by means of a motionless mixer in a reactor to form a fine dispersion of the partially phosgenated derivatives of said phenols in said aqueous solution,
B) reacting said dispersion in a residence time section of said reactor, during a residence time in said section in the range from about 20 to about 40 seconds, into a coarse dispersion containing said partially phosgenated derivatives of said phenols,
C) mixing said coarse dispersion containing said partially phosgenated derivatives of said phenols in a second motionless mixer in said reactor to form a second fine dispersion,
D) reacting said second fine dispersion in a second residence time section in said reactor into a second coarse dispersion containing said phosgenated derivatives of said phenols,
E) mixing additional aqueous caustic solution with said dispersion,
F) cooling said dispersion to a temperature in the range from about 25° C. to about 45° C., and
G) repeating the mixing and reacting steps of A through D until a dispersion of a polycarbonate prepolymer having a weight average molecular weight range of about 4,000 to about 12,000 is obtained,
H) cooling said dispersion to a temperature in the range from about 25° C. to about 45° C. and mixing a tertiary amine catalyst with said dispersion to form said polycarbonate resin, and
I) recovering said polycarbonate resin.

9. An interfacial process for the production of high weight average molecular weight polycarbonate resin, consisting essentially of the steps of
A) mixing one or more dihydric phenols, one or more polyhydric phenols having more than two hydroxyl groups per molecule, an aqueous caustic solution, a halogenated organic solvent and phosgene by means of at least one motionless mixer in a reactor to form a fine dispersion of the partially phosgenated derivatives of said phenols in said aqueous solution,
B) reacting said dispersion in a residence time section of said reactor, during a residence time in said section in the range from about 5 to about 75 seconds, into a coarse dispersion containing said partially phosgenated derivatives of said phenols,
C) repeating the mixing and reacting steps of A and B one or more times until said phenols are completely phosgenated,
D) mixing additional aqueous caustic solution with said dispersion,
E) cooling said dispersion to a temperature in the range from about 25° C. to about 45° C.,
F) repeating the mixing and reacting steps of A and B whereby a dispersion of a polycarbonate prepolymer having a weight average molecular weight range of about 4,000 to about 12,000 is obtained,
G) mixing a tertiary amine catalyst with said dispersion to form said polycarbonate resin, and
H) recovering said polycarbonate resin.

10. An interfacial process for the production of high weight average molecular weight polycarbonate resin, consisting essentially of the steps of
A) mixing bisphenol A, one or more polyhydric phenols having more than two hydroxyl groups per molecule, an aqueous caustic solution, methylene chloride and phosgene by means of at least one motionless mixer in a reactor to form a fine dispersion of the partially phosgenated derivatives of said phenols in said aqueous solution,
B) allowing said dispersion to react in a residence time section in said reactor, during a residence time in said section in the range from about 20 to about 40 seconds, into a coarse dispersion containing said partially phosgenated derivatives of said phenols,
C) repeating the mixing and reacting steps of A and B one or more times until said phenols are completely phosgenated,
D) mixing additional aqueous caustic solution with said dispersion,
E) cooling said dispersion to a temperature in the range from about 25° C. to about 45° C.,
F) repeating the mixing and reacting steps of A and B whereby a dispersion of polycarbonate prepolymer having a weight average molecular weight range of about 4,000 to about 12,000 is obtained,
G) mixing a trialkylamine with said dispersion to form said polycarbonate resin, and
H) recovering said polycarbonate resin.

11. An interfacial process for the production of high weight average molecular weight polycarbonate resin, consisting essentially of the steps of
A) mixing one or more dihydric phenols, one or more polyhydric phenols having more than two hydroxyl group per molecule, an aqueous caustic solution, a halogenated organic solvent and phosgene by means of a motionless mixer in a reactor to form a fine dispersion of the partially phosgenated derivatives of said phenols in said aqueous solution,
B) reacting said dispersion in a residence time section of said reactor, during a residence time in said section in the range from about 5 to about 75 seconds, into a coarse dispersion containing said partially phosgenated derivatives of said phenols, C) mixing said coarse dispersion containing said partially phosgenated derivatives of said phenols in a second motionless mixer in said reactor to form a second fine dispersion, D) reacting said second fine dispersion in a second residence time section in said reactor into a second coarse dispersion containing said phosgenated derivatives of said phenols, E) mixing additional aqueous caustic solution with said dispersion, F) cooling said dispersion to a temperature in the range from about 25° C. to about 45° C., G) repeating the mixing and reacting steps of A through D until a dispersion of a polycarbonate prepolymer having a weight average molecular weight range of about 4,000 to about 12,000 is obtained, H) mixing a tertiary amine catalyst with said dispersion to form said polycarbonate resin, and I) recovering said polycarbonate resin.

12. An interfacial process for the production of high weight average molecular weight polycarbonate resin, consisting essentially of the steps of A) mixing bisphenol A, one or more polyhydric phenols having more than two hydroxyl groups per molecule, an aqueous caustic solution, a chlorinated organic solvent and phosgene by means of a motionless mixer in a reactor to form a fine dispersion of the partially phosgenated derivatives of said phenols in said aqueous solution, B) reacting said dispersion in a residence time section in said reactor, during a residence time in said section in the range from about 5 to about 75 seconds, into a coarse dispersion containing said partially phosgenated derivatives of said phenols, C) mixing said coarse dispersion containing said partially phosgenated derivatives of said phenols in a second motionless mixer in said reactor to form a second fine dispersion, D) reacting said second fine dispersion in a second residence time section in said reactor into a second coarse dispersion containing said phosgenated derivatives of said phenols, E) mixing additional aqueous caustic solution with said dispersion, F) cooling said dispersion to a temperature in the range from about 25° C. to about 45°·C., G) repeating the mixing and reacting steps of A through D until a dispersion of a polycarbonate prepolymer having a weight average molecular weight range of about 4,000 to about 12,000 is obtained, H) mixing a trialkylamine with said dispersion to form said polycarbonate resin, and I) recovering said polycarbonate resin.

* * * * *